(12) United States Patent
Yu

(10) Patent No.: US 7,486,502 B2
(45) Date of Patent: Feb. 3, 2009

(54) COMPUTER WITH STATUS DISPLAY MODULE

(75) Inventor: Yen-Po Yu, Taipei (TW)

(73) Assignee: Asustek Computer Inc., Taipei (TW)

( * ) Notice: Subject to any disclaimer, the term of this patent is extended or adjusted under 35 U.S.C. 154(b) by 56 days.

(21) Appl. No.: 11/757,766

(22) Filed: Jun. 4, 2007

(65) Prior Publication Data
US 2007/0283051 A1  Dec. 6, 2007

Related U.S. Application Data

(60) Provisional application No. 60/811,018, filed on Jun. 5, 2006.

(51) Int. Cl.
*G06F 1/16* (2006.01)
(52) U.S. Cl. ............... 361/681; 710/1; 710/313; 345/535; 348/553
(58) Field of Classification Search ......... 345/530, 345/535, 98, 204; 348/97, 459, 553, 734; 707/10, 104.1; 710/8, 100, 313; 361/679–687, 361/724–727
See application file for complete search history.

(56) References Cited

U.S. PATENT DOCUMENTS

2004/0257305 A1*  12/2004  Liao et al. .............. 345/60

2006/0020936 A1*  1/2006  Wyatt .................. 717/162
2006/0119595 A1*  6/2006  Hsuan et al. ............ 345/211

FOREIGN PATENT DOCUMENTS

CN  1506821  6/2004

OTHER PUBLICATIONS

English language translation of abstract of CN 1506821.

* cited by examiner

*Primary Examiner*—Hung V Duong
(74) *Attorney, Agent, or Firm*—Thomas, Kayden, Horstemeyer & Risley

(57) ABSTRACT

A computer including a chassis, a motherboard, an electronic component, an I/O port and a status display module is provided. The motherboard is disposed in the chassis. The electronic component is electrically connected with the motherboard. The I/O port is electrically connected with the motherboard and has at least one machine code to indicate the status of the electronic component. The status display module is electrically connected with the motherboard. The status display module includes a decoder and a display device. The decoder is configured to translate the machine code into a text description. The display device is disposed on the chassis and is electrically connected to the decoder to display the text description.

11 Claims, 2 Drawing Sheets

COMPUTER WITH STATUS DISPLAY MODULE

CROSS-REFERENCE TO RELATED APPLICATION

This application claims the priority benefit of U.S. Provisional Application Ser. No. 60/811,018, filed Jun. 5, 2006, the full disclosures of which are incorporated herein by reference.

BACKGROUND

1. Field of Invention

The present invention relates to a computer, and more particularly, to a computer with a status display module.

2. Description of Related Art

Inspecting computer accessories and end users making repairs when a computer malfunctions have become common in recent years. In general, if a computer fails users have to replace the accessories within the computer one by one to locate the hardware problem. Obviously, this approach is inefficient and costly.

A conventional debug card, which is built in or plugged in a motherboard, can point out the hardware problem. However, most conventional debug cards display machine code through two digital LEDs. Users have to check the machine code in the manual to identify the working condition of the computer. In addition, users have to open the chassis to install the debug card and then read the machine code. This is quite bothersome and inconvenient.

Accordingly, it is required to provide a computer, which can display status on the outside of the computer through text descriptions, thereby enhancing the operating convenience for users.

SUMMARY

It is an aspect of the present invention to provide a computer with a status display module, which has a decoder to translate machine code into a text description. Thus, users can know the status of the computer intuitively.

It is another aspect of the present invention to provide a computer with a status display module, which has a display device positioned to be externally readable. Thus, users can know the status of the computer without having to open the chassis.

In accordance with an embodiment of the present invention disclosed herein, a computer including a chassis, a motherboard, an electronic component, an I/O port and a status display module is provided. The motherboard is disposed in the chassis. The electronic component is electrically connected with the motherboard. The I/O port is electrically connected with the motherboard and has machine codes to indicate the status of the electronic component. The status display module is electrically connected to the motherboard. The status display module includes a decoder and a display device. The decoder is configured to translate the machine codes into text descriptions. The display device is disposed on the chassis and is electrically connected to the decoder to display the text descriptions.

In accordance with an embodiment of the present invention, a computer with a status display module is provided. The status display module has a decoder to translate machine codes into text descriptions. Moreover, the status display module has a display device positioned to be externally readable. Thus, users can know the status of the computer intuitively.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

Conventionally, a computer with a debug card displays machine code through two digital LEDs. Thus, users have to check the machine code in the manual to identify the working condition of the computer. In addition, the conventional debug card is mounted inside the chassis of the computer. Hence, the machine code may be readable only if the cover to the chassis is removed. In accordance with an embodiment of the present invention disclosed herein, a computer with a status display module is provided. The status display module has a decoder to translate machine codes into text descriptions and a display device positioned to be externally readable. Thus, the status display module can display the status of the components within the computer on the outside of the computer and users can know the status of the computer intuitively.

Figure 1:
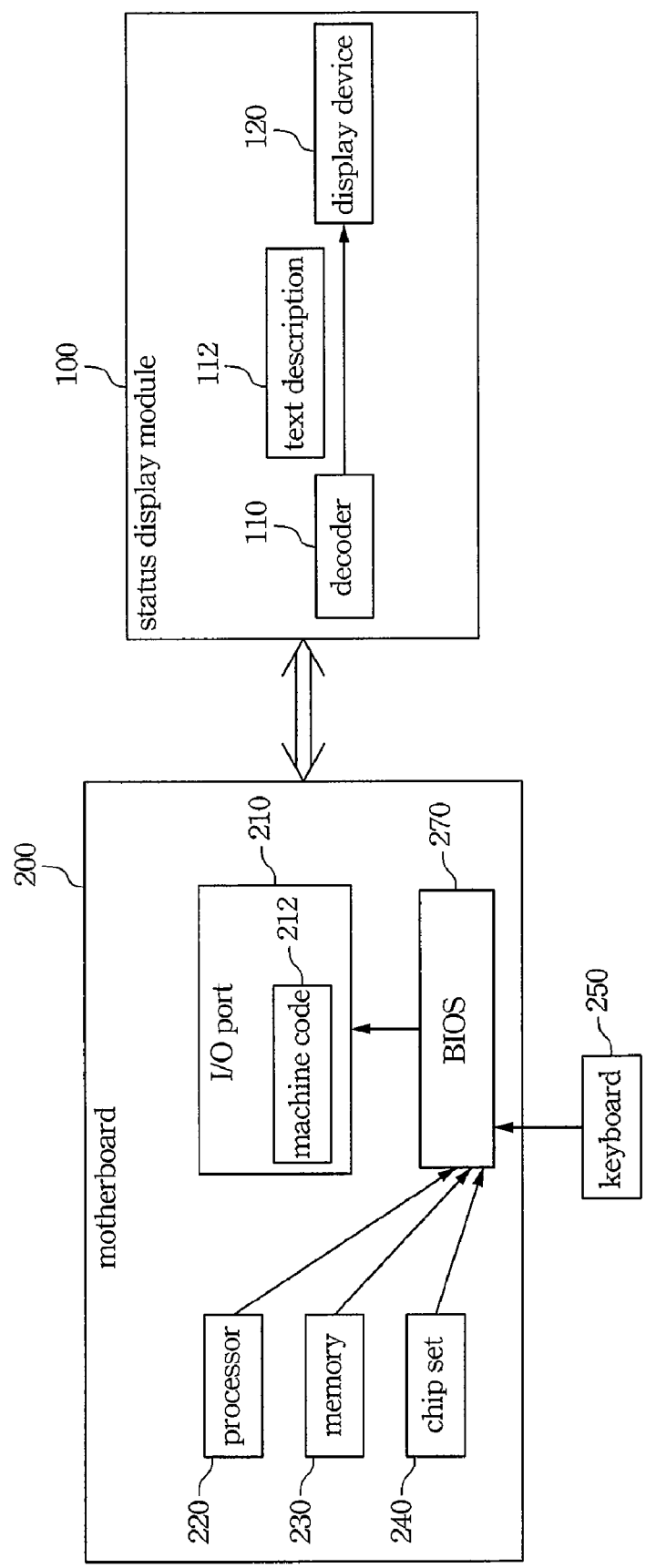
FIG. 1 is a block diagram of a status display module according to one preferred embodiment of this invention.

FIG. 1 is a block diagram of a status display module according to one preferred embodiment of this invention. In FIG. 1, the status display module 100 is electrically connected with the motherboard 200. The motherboard 200 has an I/O port 210 electrically connected therewith. The I/O port 210 records at least one machine code 212 to indicate the status of the electronic components within a computer. The electronic component may be a processor 220, a memory 230 or a chipset 240, which is disposed on the motherboard 200. Also, the electronic components may be peripheral devices, for instance, a keyboard 250 electrically coupled with the motherboard. The status display module 100 includes a decoder 110 and a display device 120. The decoder 110 is configured to translate the machine code 212 into a text description 112. The display device 120, which is electrically connected to the decoder, can display the text description.

With continued reference to FIG. 1, the I/O port 210 may be at address 0x80 of the motherboard 200. The machine code may be a power-on self-test (POST) code generated by the basic input/output system (BIOS) 270 within the motherboard 200. For instance, POST codes "C1H", "25h" and "50h" correspond to the processor 220, the memory 230 and the chipset 240 respectively. The decoder 110 is capable of translating the machine codes "C1H", "25h" and "50h" into text descriptions, for example, "processor", "memory" and "chipset". The display device 120 is capable of displaying the text descriptions to indicate the status of the computer.

More specifically, when the BIOS 270 diagnoses the processor 220, the machine code "C1H" is recorded in the 0x80 port of the motherboard 200. After successful initialization, the machine code recorded in the 0x80 port is replaced with "25h", which corresponds to the memory 230. Subsequently, if the memory 230 is successfully initialized, the machine code is replaced with "50h" and the chipset 240 is initialized. During the diagnostic process, the decoder 110 translates the machine codes into the text description 112 in turn and the display device 120 displays the text descriptions. Thus, users can know the status of the computer without having to check the machine code on manual.

Figure 2:
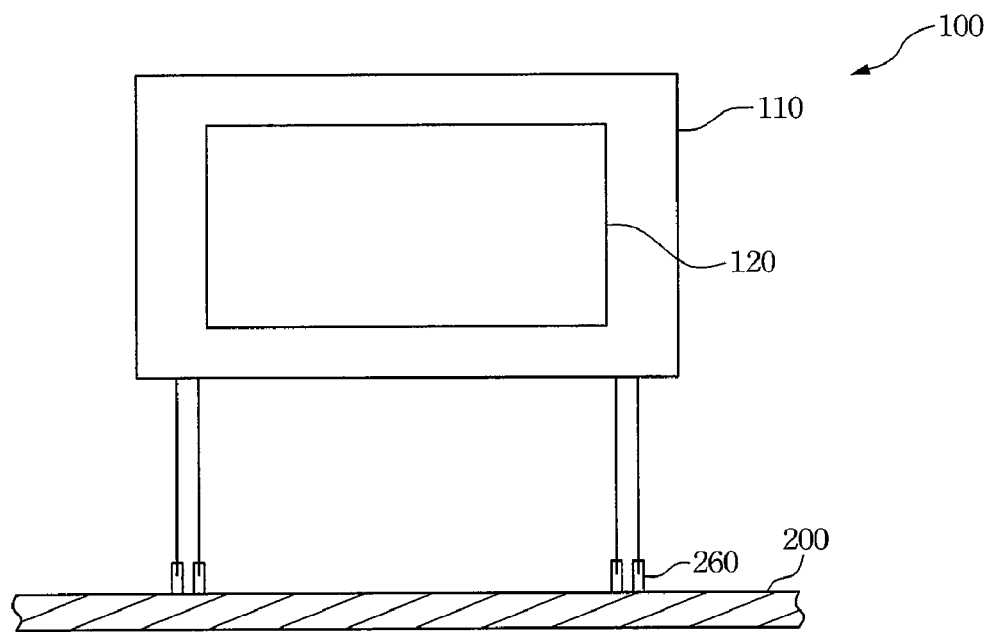
FIG. 2 illustrates a status display module according to the preferred embodiment of the present invention.

FIG. 2 illustrates a status display module according to the preferred embodiment of the present invention. Referring to FIG. 2, the motherboard 200 includes an interface 260, such as an Inter-Integrated Circuit (I2C) Bus interface or a Peripheral Component Interconnect (PCI) interface. The status display module 100 is electrically connected with the motherboard 200 via the interface 260. The decoder 110 can read and translate the power-on self-test (POST) codes of the motherboard 200 into text descriptions. The display device 120 can be a liquid crystal display with a back-light module, which can show the text descriptions under circumstances of insufficient illumination.

Figure 3:
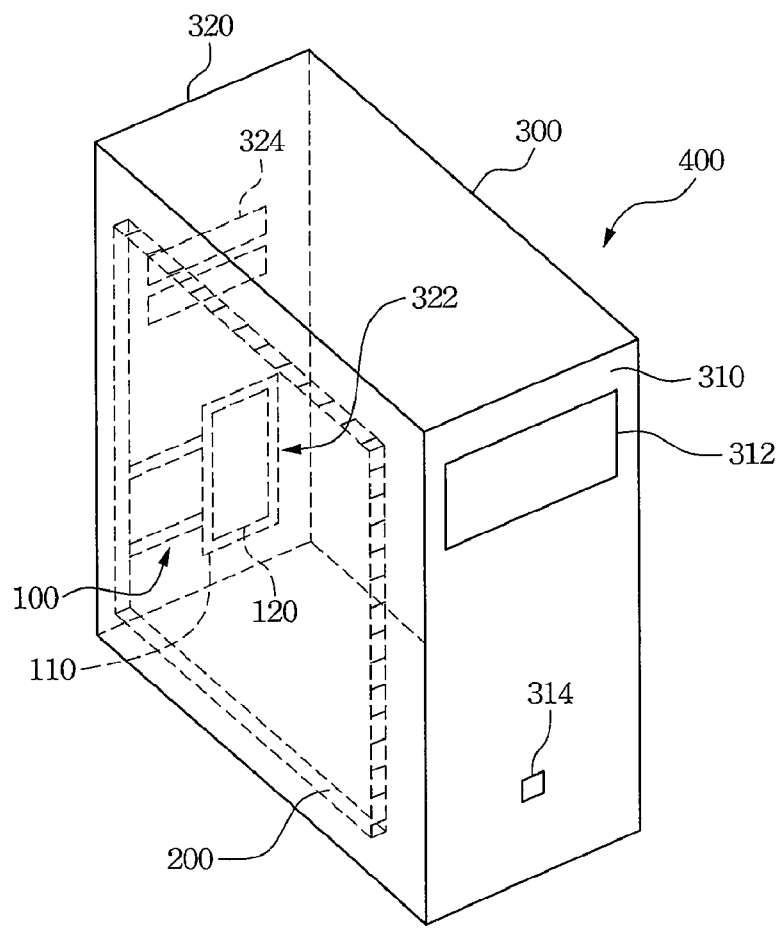
FIG. 3 illustrates a computer according to the preferred embodiment of the present invention.

FIG. 3 illustrates a computer according to the preferred embodiment of the present invention. In FIG. 3, the computer 400 includes a chassis 300, a motherboard 200 and a status display module 100. The motherboard 200 is disposed in the chassis 300. The status display module 100 is electrically connected with the motherboard 200 to display the status of the components within the computer 400. The display device 120 can be disposed in an opening 322, which can be at any appropriate location of the chassis 300, as long as the display device 120 may be externally readable.

With continued reference to FIG. 3, the chassis 300 includes a front panel 310 with a power button 314 disposed thereon and a corresponding back panel 320. The display device 120 can be positioned on the front panel 310 or on the back panel 320 to enhance the operating convenience for users. Moreover, the display device 120 can be disposed at a standard opening on the chassis 300. For instance, the display device 120 can be disposed at the standard opening 324 for mounting peripheral card or the standard opening 312 for mounting peripheral devices such as disc drives. Thus, the display device 120 can be installed in a general chassis without having to produce a particular opening on the chassis 300. Generally, mounting the display device 120 on the front panel 310 allows users to see the intuitive text descriptions thereof more conveniently.

In accordance with an embodiment of the present invention disclosed herein, a computer with a status display module is provided. The status display module has a decoder to translate machine code into a text description. Thus, the status display module can display status of the components within the computer.

In accordance with an embodiment of the present invention disclosed herein, a computer with a status display module is provided. The status display module has a display device positioned to be externally readable. Thus, the status display module can display status of the components within the computer on the outside of the computer.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer comprising:
    a chassis;
    a motherboard, disposed in the chassis;
    at least one electronic component, electrically connected with the motherboard;
    an I/O port, electrically connected with the motherboard, having at least one machine code to indicate the status of the electronic component; and
    a status display module, electrically connected with the motherboard, comprising:
        a decoder configured to translate the machine code into a text description; and
        a display device, disposed on the chassis and electrically connected to the decoder to display the text description.

2. A computer as recited in claim 1, wherein the electronic component is a processor, a memory or a chipset.

3. A computer as recited in claim 1, wherein the electronic component is a peripheral device electrically connected with the motherboard.

4. A computer as recited in claim 1, wherein the I/O port is at address 0x80.

5. A computer as recited in claim 1, wherein the machine code is a power-on self-test (POST) code.

6. A computer as recited in claim 1, wherein the status display module is electrically connected with the motherboard via an interface.

7. A computer as recited in claim 6, wherein the interface is an Inter-Integrated Circuit (I2C) Bus interface or a Peripheral Component Interconnect (PCI) interface.

8. A computer as recited in claim 1, wherein the display device is disposed in an opening on the chassis.

9. A computer as recited in claim 1, wherein the display device is disposed on a front panel opening or a back panel opening on the chassis.

10. A computer as recited in claim 9, wherein the opening is a standard opening for mounting peripheral devices.

11. A computer as recited in claim 9, wherein the opening is a standard opening for mounting peripheral cards.

* * * * *